United States Patent
Gooch

[15] 3,672,310
[45] June 27, 1972

[54] RAILWAY TRANSMISSION

[72] Inventor: John Henry Gooch, Goldsmith Cottage, Albourne, Hassocks, England

[22] Filed: Sept. 29, 1969

[21] Appl. No.: 861,711

[30] Foreign Application Priority Data

Oct. 16, 1968 Great Britain.....................49,033/68

[52] U.S. Cl..............................105/96.2, 74/720, 105/97, 105/98, 105/108, 105/130, 105/136, 192/3.32, 192/48.9

[51] Int. Cl. ...................B61d 9/34, B61d 9/48, F16h 47/02

[58] Field of Search................105/130, 136, 96.2, 97, 98, 105/108; 192/3.5, 3.21, 3.31, 3.32, 48.9, 48.91; 74/720

[56] References Cited

UNITED STATES PATENTS

| | | | |
|---|---|---|---|
| 2,825,235 | 3/1958 | Hindmarch | 74/720 X |
| 2,949,793 | 8/1960 | Suri | 74/720 X |
| 1,813,140 | 7/1931 | Bethel | 105/136 X |
| 2,029,981 | 2/1936 | Black | 105/130 X |
| 3,126,988 | 3/1964 | Memmer | 192/3.5 |
| 3,447,397 | 6/1969 | Black et al. | 105/130 X |

Primary Examiner—Arthur L. La Point
Assistant Examiner—Howard Beltran
Attorney—Jecies and Greenside

[57] ABSTRACT

The invention provides a two speed transmission system for a diesel electric locomotive having a bogey or like live axle carrying means, a live axle journaled in said axle carrying means and connecting together a pair of driving wheels, an electrical traction motor held in spaced relation relative to said live axle by at least one steady arm pivoted on said live axle, means for supporting at least a part of the weight of said motor from said bogey and a driving unit connecting the shaft of said motor to said axle said driving unit including a disengageable positive coupling means such as a synchronous clutch in said driving connection between said motor shaft and said axle and a slip coupling such as a fluid coupling one element of which is connected to each element of said positive coupling means.

5 Claims, 4 Drawing Figures

PATENTED JUN 27 1972

Inventor

John Henry Gooch

By

His Attorneys

Inventor

John Henry Gooch

By

His Attorneys

RAILWAY TRANSMISSION

This invention relates to the transmission system of a vehicle of the kind in which a live driving axle is powered by an electrical traction motor connected to said axle by steady arms hereinafter referred to as a vehicle of the kind described. One such vehicle for example, is a diesel-electric railway locomotive or powered rolling stock.

It is an object of the present invention to provide a transmission system between the motor and the axle which will solve the problem of the falling off of torque as the maximum speed of the motor is approached.

It is a further object of the invention to provide a transmission system which will reduce the shock loading to which the track is subjected at high speeds from the driving wheels of a diesel electric locomotive having the normal coupling gears between the motor shaft and the live axle.

Other objects of the invention will appear from the description which follows.

It has to be remembered that with locomotives of this kind the final reduction gearing consists of a spur gear on the axle and a smaller gear wheel on the output shaft of the motor and in order to keep these gears always in alignment the motor is mounted either in front of or behind the axle and is positioned relative to the axle by steady arms so that there is a pivotal movement of the motor relative to the axle. Such a driving unit will hereinafter be referred to as a driving unit of the kind described. The effect of this arrangement is that the upward and downward movement of the axle results in the production of forces tending to accelerate or decelerate the armature of the motor. At low speeds this shock loading can be tolerated by proper design of the track but at the higher speed now being attained greatly increased forces are produced resulting in heavy wear and the danger of rail fractures occurring particularly at vulnerable places like points and crossings.

One of the objects of the present invention is to overcome either or both of the above problems in a simple and practical manner.

According to the present invention there is provided a driving unit for the driving axle of a vehicle of the kind described which includes a disengageable positive coupling means between the motor shaft and the axle and a slip coupling, one element of which is connected to each element of the positive coupling. The weight of the electric motor may be supported on a line passing through its center of gravity.

In order that the invention may be more clearly understood one embodiment of the driving unit as applied to a railway vehicle will now be described with reference to the drawings wherein.

Figure 1:
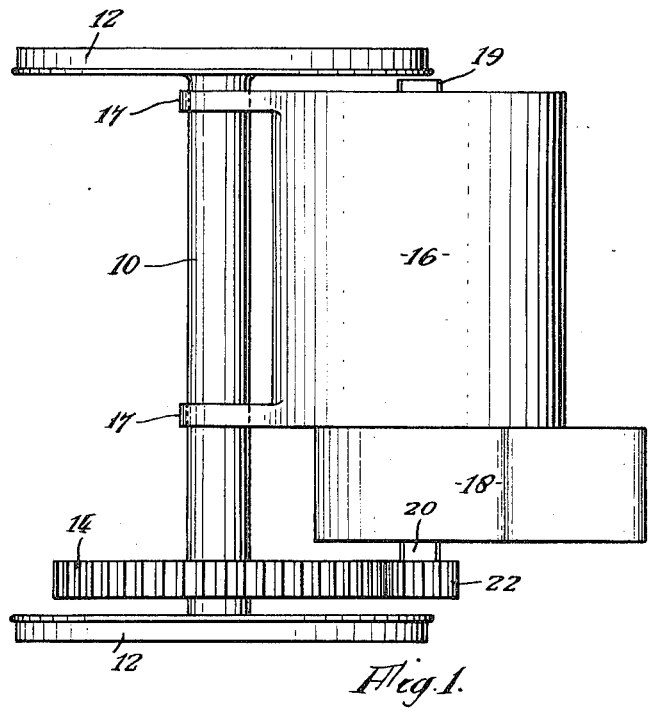
FIG. 1 is a diagrammatic plan view of a driving unit having a pair of driving wheels.
Figure 2:
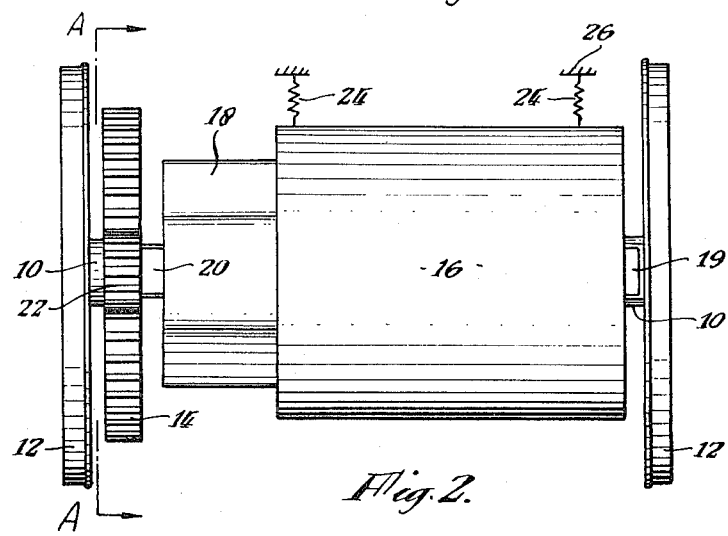
FIG. 2 is a diagrammatic end elevation of the driving unit shown in FIG. 1.
Figure 3:
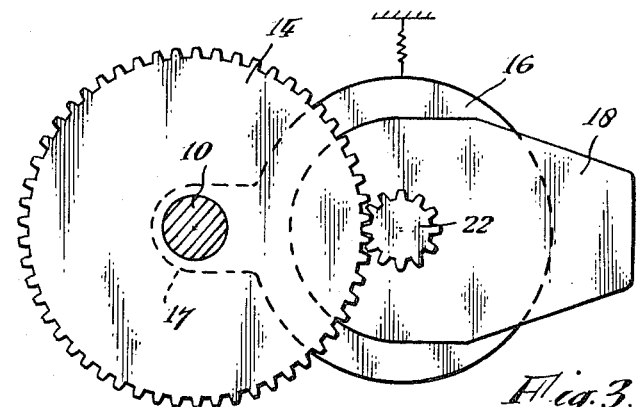
FIG. 3 is a transverse sectional elevation on the line A—A in FIG. 2 of the driving unit shown in FIG. 1.

In the form shown in the drawings the live axle 10 carrying the flanged driving wheels 12 supported in bearings (not shown) carries a final drive spur wheel 14. The housing 16 of an electric motor which may be either DC of AC is provided with steady arms 17 journaled on the axle 10. Secured to one end of the housing 16 is the case 18 of an overdrive mechanism constituted of a synchronous clutch and a fluid coupling and which will be described in greater detail later, and from this housing 16 at one side there protrudes one end of the armature shaft 19 and at the other side an output drive shaft 20 carrying a pinion 22 which is in constant mesh with the spur wheel 14. As will be seen from FIGS. 2 and 3, the motor housing 16 is supported by springs 24 from the bogey framework indicated at 26 in a plane passing through the center of gravity of the motor which in the example shown can be regarded as lying on the axis of the motor armature shaft 19, which is coaxial with the drive shaft 20.

Figure 4:
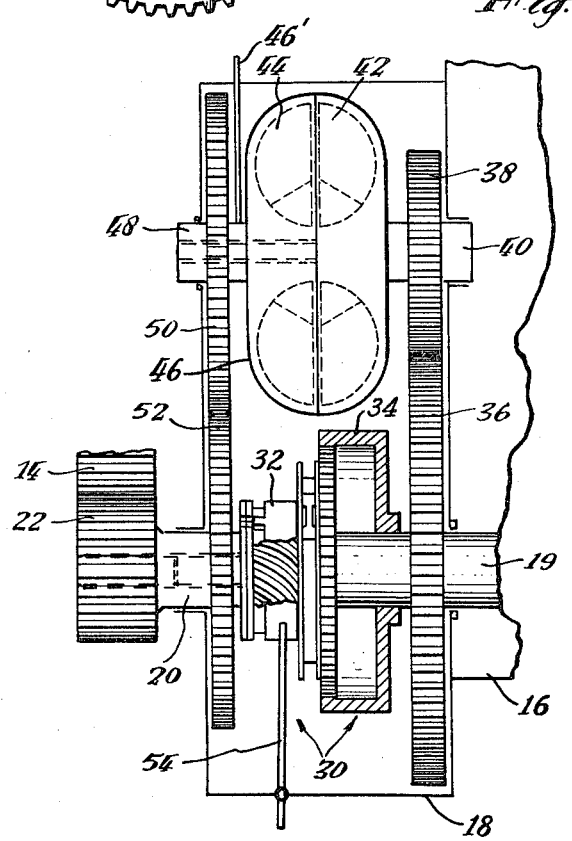
FIG. 4 is a diagrammatic plan view to an enlarged scale of the part of the drive unit between the output shaft of the motor and the final reduction pinions.

Turning now to FIG. 4 the overdrive mechanism will now be described. It consists of a synchronous clutch 30 having two elements 32 and 34 respectively the element 32 being mounted on the output shaft 20 whilst the element 34 is secured to the armature shaft 19 of the motor. The operational characteristics of a synchronous clutch is more particularly described in the Oct. 18, 1963 issue of the publication ENGINEERING. Suffice it to say that once a synchronous clutch is engaged torque will continue to be transmitted between the input and output shafts. If however the output shaft overruns the input shaft the clutch will automatically disengage. The operational characteristics of fluid couplings are also well known, reference being made in this regard to the May 1966 publication released by Fluidrive Engineering Company Ltd. titled FLUIDRIVE FLUID COUPLINGS, Catalogue Reference D–1 Issue A. As is known and disclosed in such release, the fluid coupling will slip, and hence be disengaged, when fluid is withdrawn therefrom and will be engaged when filled with fluid. The fluid, as described in said publication, is retained in a reservoir forming part of the coupling, filling and emptying of the fluid being under control of a manually or automatically controlled lever forming part of the fluid coupling and being diagrammatically shown in FIG. 4 with reference character 46'.

With continued reference to FIG. 4, secured to the shaft 19 is a spur wheel 36 which is in mesh with a smaller pinion 38 on a lay shaft 40 on which is mounted the two components constituting the runner 42 and the impeller 44 of the mentioned fluid coupling designated generally as 46. The output shaft 48 of the fluid coupling 46 carries a spur wheel 50 which meshes with another spur wheel 52 of like size secured to the output shaft 20 on which the pinion 22 is mounted. It is not an inherent feature of the system that the train of gears on the power output side of the fluid coupling i.e., gear wheels 50 and 52 are necessarily of the same size. They might not be in some applications. What is essential is that there is an overall speed increasing ratio through the gears from the input side of the clutch to the output side of the clutch and it is purely a matter of choice how this is brought about by arranging the sizes of the four gear elements 36, 38, 50, and 52 which are concerned. A lever 54 connected to selector mechanism not shown provides for forward and reverse drive and a neutral position. The synchronous clutch 30 is of the "two way" kind having a simple control actuated by the lever 54 which determines whether it is operative in a clockwise or counter clockwise direction or set in neutral. The spur wheel 36 and pinion 38 are arranged to provide a 2 to 1 ratio but this subject to the above comment, can be any other suitable ratio.

The mode of operation is as follows:

Prior to starting the vehicle from rest, the synchronous clutch 30 is set by lever 54 for the correct direction of rotation for either forward or reverse drive. When the current and power is applied to the traction motor in the housing 16 the fluid coupling is empty and thus cannot transmit power, and so the drive is directly from the armature shaft 19 through the synchronous clutch 30 which engages, and remains engaged, whilst the input side of its 34 drives the output side 32, and continues to be so until some intermediate speed is reached, say half the maximum speed of the vehicle, if the overdrive ratio is two to one, at which speed the coupling is automatically or manually filled with fluid, whereupon the fluid coupling 46 is engaged. This causes the drive to be taken up by the fluid coupling 46 because of the different gear ratios, and the synchronous clutch 30 overruns, the speed of the motor and armature shaft 19 drops thus causing clutch element 34 to rotate more slowly than clutch element 32 and the vehicle continues to increase speed as required until the maximum speed is reached. On reducing speed, at round about the same intermediate speed, the fluid is withdrawn and coupling 46 is disengaged, whereupon the motor accelerates and the synchronous clutch 30 engages automatically and once more the drive is direct from the motor through the synchronous clutch 30. Obviously the changeover from low to high ratio and vice versa should take place at different speeds to avoid hunting.

The unique advantages of the above described arrangement are twofold:

Firstly, the entire speed range of the vehicle is covered by two ratios of transmission from the motor armature shaft 19, through the synchronous clutch 30 for the lower part of the vehicle speed range and through the fluid coupling 46 for the higher part of the vehicle speed range, thus enabling the traction motor to be used at its full rated power over a wider speed range than would be possible with single ratio transmission. The second advantage relates to the shock loading between the wheels of the vehicle and the railway track. Due to irregularities in the track the wheels of the vehicle are liable to irregular and sometimes sudden motion in the vertical plane. This is transmitted through the axle mounted gear wheels to the motor-overdrive unit through the output gear wheels from that unit at the point at which the two gears mesh, i.e., spur wheel 14 and pinion 22. Throughout the lower part of the speed range, when the drive is through the clutch, this will produce shock loading arising from the fact that the gears are directly connected to the armature of the motor which has a high moment of inertia and can be regarded as a heavy flywheel. Because of this high inertia there will be a tendency for sharp reactions to arise at the bearing of the driving gear wheel and on the axle. These reactions at the bearing in the motor-overdrive unit will release themselves by causing some movement of the motor-overdrive unit on its sprung suspension, whereas the reactions on the axle from the axle mounted gearwheel cause shock loading between the wheels and the track. In this respect the shock loading characteristics of the arrangement are similar to those of conventional axle hung nose-mounted individual axle traction motors, with this important difference, that the clutch, being a one way only device, will only cause shock loading to occur when the irregular sudden motion of the vehicle wheel is either upwards or downwards. The synchronous clutch 30 will override in one direction, i.e., transmit torque in only one direction. The shock loading can therefore only take place either when the wheel is displaced upwards or downwards relative to the vehicle according to whether the motor is mounted in front of or behind the axle 10 regarded in the direction of movement of the vehicle. For the higher part of the vehicle speed range, the fluid coupling is engaged and the output gear of the motor-overdrive unit is therefore isolated in terms of sudden transient motion or shock from the armature shaft 19 of the motor. This is known characteristic of a fluid coupling. Therefore, this output gear easily and lightly responds to irregular vertical movement of the axle mounted gear and the shock loading on the wheels becomes very small. Thus the arrangement provides for a considerable reduction in shock loading on the wheels arising from track irregularities and the inertia of the motor-overdrive unit over the higher part of the vehicle speed range, which is where shock loading is most harmful to wheels and track. Because the motor overdrive unit is suspended from the bogey in the same vertical plane as its center of gravity, the steady arms which grip the axle do not transmit any of the weight of the motor-overdrive unit directly to the axle and negligible shock loading arises through them.

In an alternative arrangement similar to the above, the motor is suspended from the bogey in a vertical plane not coincident with its center of gravity and part of the motor-overdrive weight is transmitted through the steady arms to the axle.

The overdrive may include a coupling in parallel with the clutch which may be of any type which can be described as a disengageable slip coupling for example an electromagnetic coupling, inpower couplings, torque converters, etc.

The overdrive unit may be wholly replaced by any type of slip coupling.

The arrangement may include belt or chain drives instead of gears in the overdrive.

If an overdrive ratio is not desired the arrangement described above may be varied so that the gear train linking the input and output sides of the synchronous clutch does not provide an increase in speed but only a sufficient ratio change to allow for slip and to enable the synchronous clutch to disengage automatically. Clutches other than synchronous may be used in place of the synchronous clutch in the overdrive unit but as explained above the synchronous clutch provides a positive advantage since it eliminates shock transmission in one direction.

Although the invention has been described with respect to its application to a vehicle for a railway it is obvious that it can be applied to a multi-axle road vehicle.

What I claim and desire to secure by Letters Patent is:

1. A transmission system for a vehicle provided with live-axle carrying means, a live-axle journaled in said axle-carrying means and connecting together a pair of driving wheels, and an electrical traction motor pivotally supported by at least one steady arm on said live-axle, at least a part of the weight of said motor being supported from said axle-carrying means, said system comprising a driving unit operatively connecting said motor to said live-axle, said driving unit comprising a synchronous clutch adapted to be driven by the output shaft of said motor and to drive said live-axle and consisting essentially of first input and output elements and slip coupling means consisting essentially of second input and output elements connected in parallel with the respective elements of said synchronous clutch, and means providing a speed increasing ratio from the input sides of said synchronous clutch and slip coupling means to the output sides thereof, said synchronous clutch being adapted to be automatically disconnected from said live-axle upon connection of said slip coupling means at a predetermined motor speed and automatically connected at a predetermined lower motor speed upon disconnection of said slip coupling means.

2. A transmission system according to claim 1, wherein said synchronous clutch is reversible.

3. A transmission system according to claim 1, wherein said slip coupling means is a fluid coupling.

4. A transmission system according to claim 1, wherein the weight of said motor supported from said axle carrying means is supported on a line passing through the center of gravity of said motor.

5. A transmission system according to claim 4, wherein at least a part of the weight of said driving unit is supported by said steady arms.

* * * * *